Patented June 13, 1933

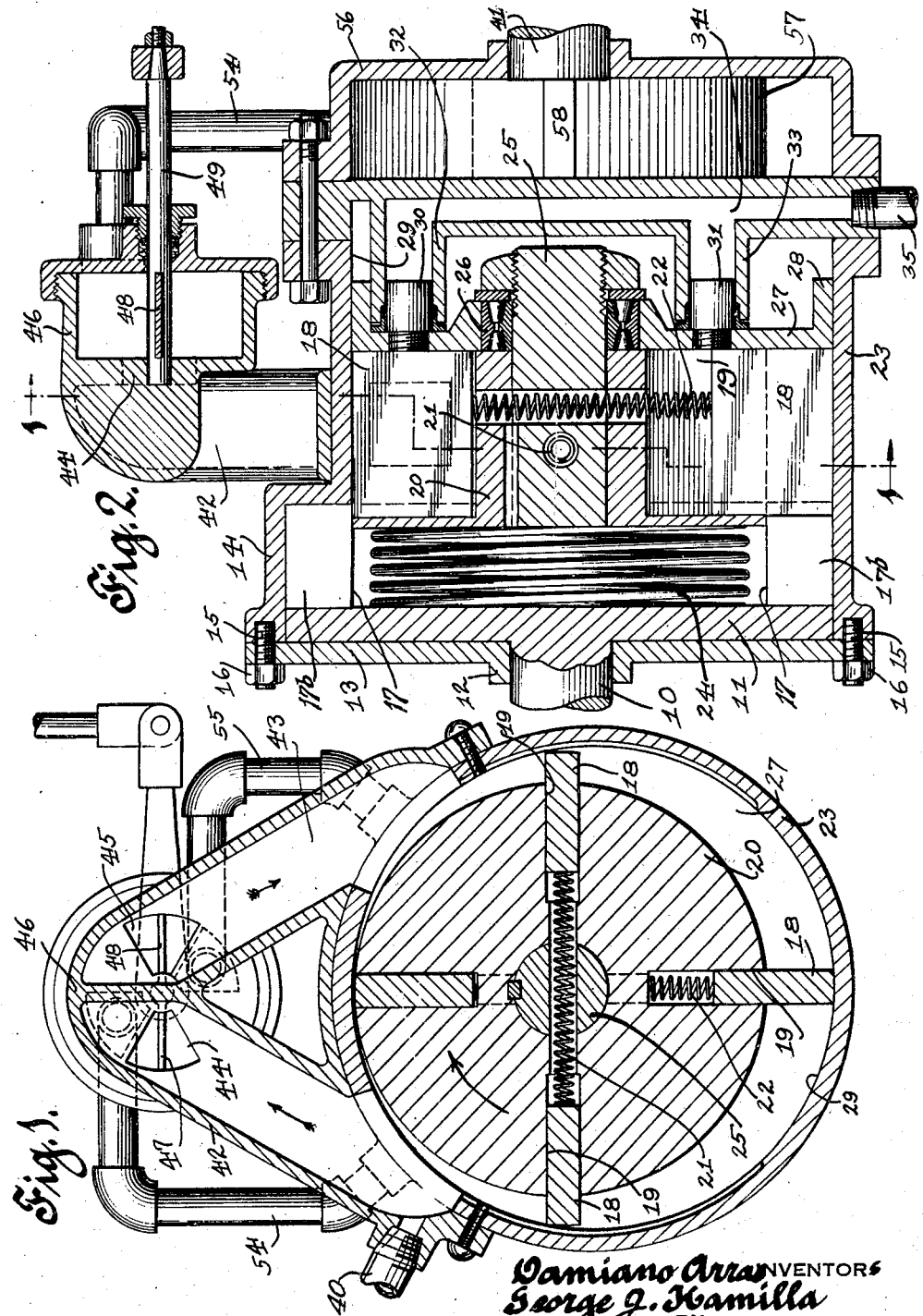

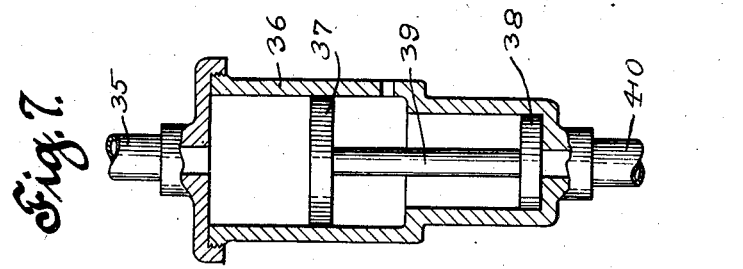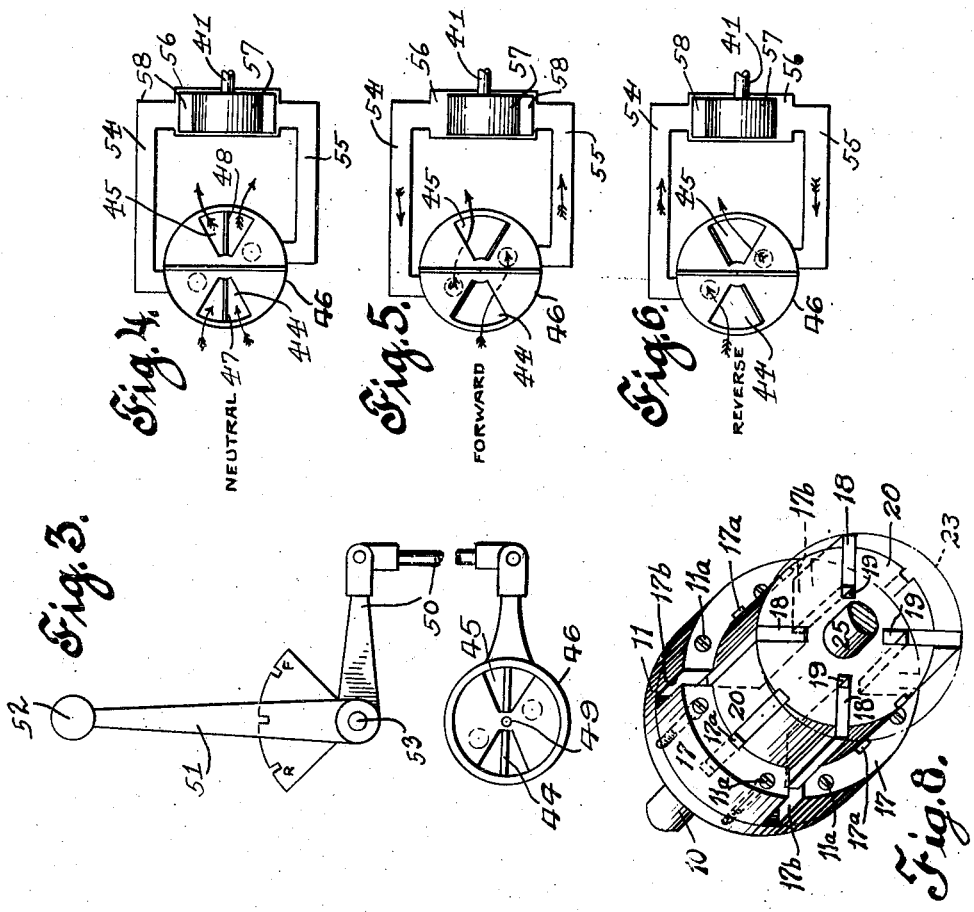

1,914,090

UNITED STATES PATENT OFFICE

GEORGE JOHN HAMILLA AND DAMIANO ARRAS, OF NEW BRITAIN, CONNECTICUT

HYDRAULIC POWER TRANSMISSION

Application filed June 10, 1930. Serial No. 460,202.

This invention relates to power transmission devices, and more particularly to a hydraulic mechanism for transmitting the power from an automobile engine at variable speed to the driving shaft of the vehicle.

One object of the invention is to provide a device of the above nature having automatic mechanism for preventing the pressure in the system from building up too rapidly which might cause stalling of the engine.

A further object is to provide a mechanism of the above nature having means whereby the amount of power transmitted may be manually controlled over a wide range of speeds.

A further object is to provide a power transmission apparatus of the above nature which will be relatively simple in construction, inexpensive to manufacture, easy to install and manipulate, compact, and very efficient and durable in use.

With these and other objects in view there has been illustrated on the accompanying drawings one form in which the invention may be conveniently embodied in practice.

In the drawings:

Fig. 1 represents a vertical transverse sectional view of the transmission mechanism taken along the line 1—1 of Fig. 2, looking in the direction of the arrows.

Fig. 2 is a longitudinal sectional view of the power transmission apparatus.

Fig. 3 is a side view of the manually-operated mechanism whereby the amount of power transmitted may be controlled.

Fig. 4 is a diagrammatic view of the power-controlling valve and its connections, the operating vanes being shown in neutral position.

Fig. 5 is a view similar to Fig. 4 showing the operating vanes in the " forward " position.

Fig. 6 is a view similar to Fig. 4 with the operating vanes in the "reverse" position.

Fig. 7 is a sectional view of the automatic equalizing cylinder.

Fig. 8 is a perspective view of the flywheel and telescoping rotor.

Referring now to the drawings in which like reference numerals denote corresponding parts throughout the several views, the numeral 10 indicates the crank shaft of an automobile engine and the numeral 11 a fly wheel integral with said shaft. The fly wheel 11 is mounted to rotate within a bearing 12 formed in a cover plate 13 secured to a fly wheel casing 14, as by screws 15 and nuts 16. The fly wheel is provided with an annular segmental rim 17 securely attached thereto by means of a plurality of fillister head screws 11a, as clearly shown in Fig. 8. The rim segments 17 are so spaced as to provide a plurality of radial slots 17b for slidably receiving a like number of blades 18 slidably carried within a plurality of slots 19 of a driving rotor 20, springs 21 and 22 being provided within the interior of said rotor 20 for pressing said blades 18 outwardly at all times against the inner circumference of an eccentric housing 23. The rotor 20 is slidably keyed to said fly wheel by means of four splines 17a, located in the inner periphery of said segmental rim 17 and slidably engaging within four slots formed on the outer periphery of said rotor 20.

A strong helical spring 24 is provided within the fly wheel 11 and is adapted to press at all times upon said rotor 20, whereby the blades 18 will be normally held within the eccentric housing 23 in the position shown in Fig. 2. The rotor 20 is keyed upon a shaft 25 adapted to rotate within a combined thrust and radial bearing 26 carried by an intermediate plate 27, said plate 27 having an exterior flange 28 adapted to slidably engage the inside surface 29 of the eccentric housing 23.

*Automatic pressure relief mechanism*

Connected with the plate 27 are a pair of small plungers 30 and 31 housed within a pair of small cylinders 32 and 33 extending rearwardly from a chamber 34 connected at its lower end to a pipe 35 leading to a stepped equalizing cylinder 36 adapted to be located at any convenient place on the vehicle. The equalizing cylinder 36 has a pair of pistons 37 and 38 located therewithin, said pistons being connected by a rod 39 and the piston 38 being smaller than the piston 37. The end of the cylinder 36 opposite from the pipe 35 is connected by a pipe 40 to the interior of the eccentric housing 23.

By means of this construction, when the power is suddenly applied, as when the car is accelerating, in order to avoid a too rapid building up of pressure in the eccentric housing 23, which might cause the engine to stall, the pressure of the oil will be transmitted through the pipe 40 into the equalizing cylinder 36 where it will force the piston 38 upwardly and cause the separate body of oil in the other end of said cylinder to flow at a higher speed and lower pressure into the chamber 34 where it will simultaneously enter the small cylinders 32 and 33.

The small pistons 30 and 31 will thereby push said rotor 20 to the left until the blades 18 thereof have partially entered the slots in the segmental rim 17 of the fly wheel 11. This will to some extent reduce the load and relieve the strain on the engine.

Valve control mechanism

In order to control the amount of power transmitted from the driving rotor 20 to a transmission shaft 41 for applying power to drive the car in the usual way, provision is made of a pair of relatively large converging oil passages 42 and 43 connected to one side of the eccentric housing 23. The passages 42 and 43 communicate respectively with a pair of sector-shaped openings 44 and 45 in a valve casing 46. Located within the valve casing 46 are a pair of oppositely disposed vanes 47 and 48 mounted on a shaft 49 adapted to be rotated by means of a lever mechanism 50 controlled by an operating arm 51 having a knob 52 at its upper end, said arm 51 being adapted to rotate about a fulcrum 53.

The valve casing 46 is adapted to be connected by a pair of relatively small pipes 54 and 55 to a casing 56 within which is located a rotor 57 having four equally-spaced radial spring-pressed blades 58 mounted therein. The rotor 57 is keyed to the shaft 41 and is eccentrically mounted within the casing 56 in a manner similar to the mounting of the rotor 20 within its housing 23.

Operation

In operation, assuming the machine to be initially in the neutral position with the valve blades 47 and 48 in the positions shown in Fig. 4, when the engine is started, the rotation of the fly wheel and rotor 20 will merely cause the oil in the eccentric housing 23 to circulate freely through the sector 44 into the valve casing 46, where it will be diverted back into the eccentric housing 23 through the sector 45, as indicated by the arrows in Fig. 4. When it is desired to start the car forward, the operator will grasp the knob 52 on the control handle 51 and move it from the neutral position to the right until it reaches the position marked "F" in Fig. 3. With the control handle 51 in its advanced position, the oil will be diverted in the valve chamber 46 through the pipe 55 into the housing 56, as shown in Fig. 5, and cause the driven rotor 57 to rotate in the same direction as the fly wheel rotor 20 and thus cause the motor vehicle to move forwardly.

As the car accelerates, the pressure developed in the eccentric housing 23 will be transmitted through the equalizing cylinder 36 to the small pistons 30 and 31 causing the driving rotor 20 with its blades 18 to slide momentarily for a short distance within the fly wheel 11. This will reduce the speed of the oil flowing through the passage 42, the sector 44, pipe 55, to the housing 56 for driving the rotor 57. The oil from said housing 56 is discharged back through the pipe 54, through the casing 46, the sector 45, and passage 43 into the eccentric housing 23. As the load on the rotor 20 decreases, the spring 24 will cause it to again move back into the eccentric housing and more power will be transmitted to the driven rotor 57.

When it is desired to throw the car into reverse, it will be only necessary to move the handle 51 to the left-hand position shown in Fig. 3, indicated by the letter "R", whereupon the oil will be forced into the housing 56 of the driven rotor 57 in the reverse direction, as shown by the arrows in Fig. 6, causing the shaft 41 to rotate in the opposite direction from that just described.

In going down a hill, as will be clearly understood, the rotors and the oil system connecting them will act as a brake and absorb power, the action being the reverse of that just described for transmitting power from the engine to the driven shaft.

It will be understood that the speed of the engine of the automobile will be controlled in the usual way by the throttle or foot accelerator, not shown.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a variable speed hydraulic gear, a driving pump member comprising a drum having radially movable vanes, an eccentric liquid containing casing surrounding said drum, said vanes being longitudinally slidable in said drum, and means responsive to an increase in load for automatically sliding said vanes longitudinally into said drum to reduce the amount of liquid being pumped.

2. In a variable speed hydraulic gear, a driving pump member comprising a drum having radially spring-pressed movable vanes, an eccentric liquid casing for said drum, spring means for pressing said vanes longitudinally in said drum, and means responsive to an increase in load for automatically forcing said vanes to slide into said drum against the action of said spring means to reduce the amount of liquid being pumped.

In testimony whereof, we have affixed our signatures to this specification.

GEORGE JOHN HAMILLA.
DAMIANO ARRAS.